(12) United States Patent
Conner et al.

(10) Patent No.: US 12,025,026 B2
(45) Date of Patent: Jul. 2, 2024

(54) GEOMETRIC APPROACH TO STRESS REDUCED INTRA-FLOW PATH SHROUDS FOR TUNING MODAL RESPONSES IN RAM AIR TURBINE ROTORS

(71) Applicant: Honeywell International Inc., Charlotte, NC (US)

(72) Inventors: Richard David Conner, Peoria, AZ (US); Ryan Cox, Gilbert, AZ (US); Josef Merki, Chandler, AZ (US); Brian Larsen, Downey, CA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/365,118

(22) Filed: Aug. 3, 2023

(65) Prior Publication Data

US 2024/0093609 A1 Mar. 21, 2024

Related U.S. Application Data

(62) Division of application No. 17/089,564, filed on Nov. 4, 2020, now Pat. No. 11,767,760.

(51) Int. Cl.
*F01D 5/10* (2006.01)
*F01D 5/02* (2006.01)
(Continued)

(52) U.S. Cl.
CPC .............. *F01D 5/10* (2013.01); *F01D 5/022* (2013.01); *F01D 5/03* (2013.01); *F01D 5/143* (2013.01);
(Continued)

(58) Field of Classification Search
CPC ..... B62J 50/21; B62M 27/02; F01N 13/1805; F01N 2340/06; F02B 2075/025;
(Continued)

(56) References Cited

U.S. PATENT DOCUMENTS

| 4,819,424 A * | 4/1989 | Bak .......................... F02K 9/70 60/39.183 |
|---|---|---|
| 5,275,531 A | 1/1994 | Roberts |
| (Continued) | | |

OTHER PUBLICATIONS

Huang et al., "Feasible Concept of an Air-Driven Fan with a Tip Turbine for a High-Bypass Propulsion System", Energies 2018, 11, 3350, Nov. 30, 2018, pp. 1 through 16, MDPI, www.mdpi.com/journal/energies.

(Continued)

*Primary Examiner* — Jesse S Bogue
(74) *Attorney, Agent, or Firm* — Fogg & Powers LLC (57) ABSTRACT

A ram air turbine rotor comprises at least one intra-flow path shroud structure coupled between rotor blades, along a radial position between a support disc and an outer rim. The shroud structure includes shroud sectors each coupled between a respective pair of blades. The sectors each include a first edge adjacent to leading edges of the respective pair of blades, the first edge including a first curved segment, and a second edge adjacent to trailing edges of the respective pair of blades, the second edge including a second curved segment. The curved segments are each partially defined by a respective ellipse having a semi-major axis and a semi-minor axis. The semi-major axis is a portion of a spanwise distance between the respective pair of blades. The semi-minor axis is a portion of an axial distance between the leading edge of one blade and the trailing edge of an adjacent blade.

6 Claims, 13 Drawing Sheets

(51) Int. Cl.
*F01D 5/03* (2006.01)
*F01D 5/14* (2006.01)
*F03D 1/06* (2006.01)
*F03D 9/32* (2016.01)

(52) U.S. Cl.
CPC ............ *F03D 1/0633* (2013.01); *F03D 9/32* (2016.05); *F05B 2220/31* (2013.01); *F05B 2240/33* (2013.01); *F05B 2240/923* (2013.01); *F05B 2250/14* (2013.01); *F05B 2250/141* (2013.01); *F05D 2240/24* (2013.01)

(58) Field of Classification Search
CPC .... F02B 37/025; F02B 37/183; F02B 37/186; F02B 39/14; F02B 37/00; F02B 39/00; Y02T 10/12; Y02T 10/40; F02D 13/0242; F02D 2041/1422; F02D 2200/0404; F02D 2200/0406; F02D 2200/101; F02D 2200/703; F02D 23/00; F02D 2400/04; F02D 41/0007; F02D 41/10; F02D 41/22; F02D 41/2474; F02D 9/105; F01D 25/186; F01D 5/022; F01D 5/03; F01D 5/10; F01D 5/143; F01D 5/16; F01D 5/225; F02C 6/12; F04D 29/063; F04D 29/102; F04D 29/056; F05D 2220/40; F05D 2240/24; F05D 2260/96; F16C 17/04; F16C 17/047; F16C 2360/24; F16C 33/1075; B64D 41/007; F03D 1/0633; F03D 9/32; F05B 2220/31; F05B 2240/33; F05B 2240/923; F05B 2250/14; F05B 2250/141; Y02E 10/72

See application file for complete search history.

(56) References Cited

U.S. PATENT DOCUMENTS

| | | | |
|---|---|---|---|
| 5,505,587 A * | 4/1996 | Ghetzler | B64D 41/007 415/49 |
| 6,270,309 B1 | 8/2001 | Ghetzler et al. | |
| 8,616,848 B2 | 12/2013 | Beeck | |
| 8,794,902 B1 * | 8/2014 | Van Ness, II | B64D 41/007 415/227 |
| 9,217,417 B2 | 12/2015 | Taneja et al. | |
| 9,512,727 B2 | 12/2016 | Johann et al. | |
| 9,546,555 B2 | 1/2017 | Chouhan et al. | |
| 9,822,647 B2 | 11/2017 | Subbareddyar et al. | |
| 9,908,635 B2 * | 3/2018 | Snyder | F01D 13/00 |
| 9,957,818 B2 | 5/2018 | Martin, Jr. et al. | |
| 10,145,247 B2 | 12/2018 | Orford | |
| 10,240,477 B2 * | 3/2019 | Ettridge | F01D 15/10 |
| 10,399,694 B2 | 9/2019 | Huang et al. | |
| 10,495,108 B2 | 12/2019 | Conner et al. | |
| 10,648,347 B2 | 5/2020 | Chakrabarti et al. | |
| 11,339,670 B2 * | 5/2022 | Ristau | F01D 5/225 |
| 2012/0237347 A1 * | 9/2012 | Chaudhry | F03D 9/00 416/149 |
| 2018/0258770 A1 | 9/2018 | Reynolds et al. | |
| 2020/0032659 A1 | 1/2020 | Zhou et al. | |
| 2022/0135242 A1 | 5/2022 | Conner et al. | |

OTHER PUBLICATIONS

U.S. Patent and Trademark Office, "Notice of Allowance", U.S. Appl. No. 17/089,564, filed May 31, 2023, pp. 1 through 13, Published: US.

U.S. Patent and Trademark Office, "Restriction Requirement", U.S. Appl. No. 17/089,564, filed Mar. 2, 2023, pp. 1 through 6, Published: US.

* cited by examiner

GEOMETRIC APPROACH TO STRESS REDUCED INTRA-FLOW PATH SHROUDS FOR TUNING MODAL RESPONSES IN RAM AIR TURBINE ROTORS

CROSS-REFERENCE TO RELATED APPLICATION

This application is a divisional of U.S. patent application Ser. No. 17/089,564, filed on Nov. 4, 2020, the contents of which is incorporated herein by reference in its entirety.

STATEMENT REGARDING FEDERALLY SPONSORED RESEARCH OR DEVELOPMENT

This invention was made with Government support. The Government has certain rights in the invention.

BACKGROUND

Ducted ram air turbine rotors can be exposed to extreme amounts of inlet distortion, due to very constrained space allocations and very aggressive flight operations. The inlet distortion can excite natural resonances of vibration modes within the rotor airfoils with enough energy to break the rotor. For a robust design, it is necessary to design the rotor such that a minimum number of vibration modes are within the operating range. This is commonly referred to as mode avoidance.

Mode avoidance can be achieved on a practical weight efficient method by the addition of circumferential shrouds within the flow path. With traditional shaped intra-flow path shrouds, the operating stresses in and around the shrouds can become too large to provide proper mode avoidance. In addition, other common tuning approaches, such as thickness redistribution methods, may not yield sufficient amounts of tuning to move the modes out of the operating range.

SUMMARY

A ram air turbine rotor comprises a support rotor disc, and a plurality of rotor blades coupled to the support rotor disc, the rotor blades extending radially outward from the support rotor disc, wherein each of the rotor blades has a leading edge and a trailing edge. An outer rim is circumferentially coupled to each of the rotor blades at distal ends thereof. A first intra-flow path shroud structure is coupled between each of the rotor blades along a first radial position between the support rotor disc and the outer rim. The first intra-flow path shroud structure includes a plurality of first shroud sectors, wherein each of the first shroud sectors is coupled between a respective pair of the rotor blades. The first shroud sectors each include a first shroud edge adjacent to the leading edges of the respective pair of the rotor blades, with the first shroud edge including a first curved segment, and a second shroud edge adjacent to the trailing edges of the respective pair of rotor blades, with the second shroud edge including a second curved segment. The first and second curved segments are each partially defined by a respective ellipse having a semi-major axis and a semi-minor axis. The semi-major axis is a predetermined portion of a spanwise distance along the shroud structure between the respective pair of the rotor blades. The semi-minor axis is a predetermined portion of an axial distance between the leading edge of one rotor blade and the trailing edge of an adjacent rotor blade of the respective pair of the rotor blades.

BRIEF DESCRIPTION OF THE DRAWINGS

Features of the present disclosure will be apparent to those skilled in the art from the following description with reference to the drawings. Understanding that the drawings depict only typical embodiments and are not therefore to be considered limiting in scope, the embodiments will be described with additional specificity and detail through the use of the drawings, in which.

DETAILED DESCRIPTION

In the following detailed description, reference is made to the accompanying drawings, in which is shown by way of illustration various exemplary embodiments. It is to be understood that other embodiments may be utilized. The following detailed description is, therefore, not to be taken in a limiting sense.

A geometric approach is described herein that provides stress reduced intra-flow path shrouds for tuning modal responses in ram air turbine rotors. The intra-flow path shrouds are designed to have minimal stress concentration by the strategic placement of scallop-shaped sections in acute corners of a shroud-to-blade interface. This configuration provides enhanced mode avoidance, which gives ram air turbine rotors a more robust design.

The present approach maintains the mode avoidance capabilities of simpler midspan shroud designs, and produces minimal aerodynamic impact for the ram air turbine rotor. Additionally, modal tuning for mode avoidance is achieved without the addition of significant weight to ram air turbines.

Further, the present approach increases the flight envelope in which ram air turbine rotors are not subject to harmful vibrations during flight. These harmful vibrations are avoided by tuning modes out of the operating range of the ram air turbine rotor.

In a method of making the present ram air turbine rotors, the intra-flow path shrouds are formed to have scallop-shaped sections in acute corners of the shroud-to-blade interface. The scallop shapes are created such as to be viewed from the outboard looking inboard radial direction, and minimize the circumferential stress concentration at the interface. The shrouds are also shaped in the flow direction to have minimal interference with aerodynamic performance. The shroud structures are formed in one or more bands circumferentially around a middle portion of the air flow path in the ram air turbine rotors.

Further details of various embodiments are described hereafter with reference to the drawings.

Figure 1A:
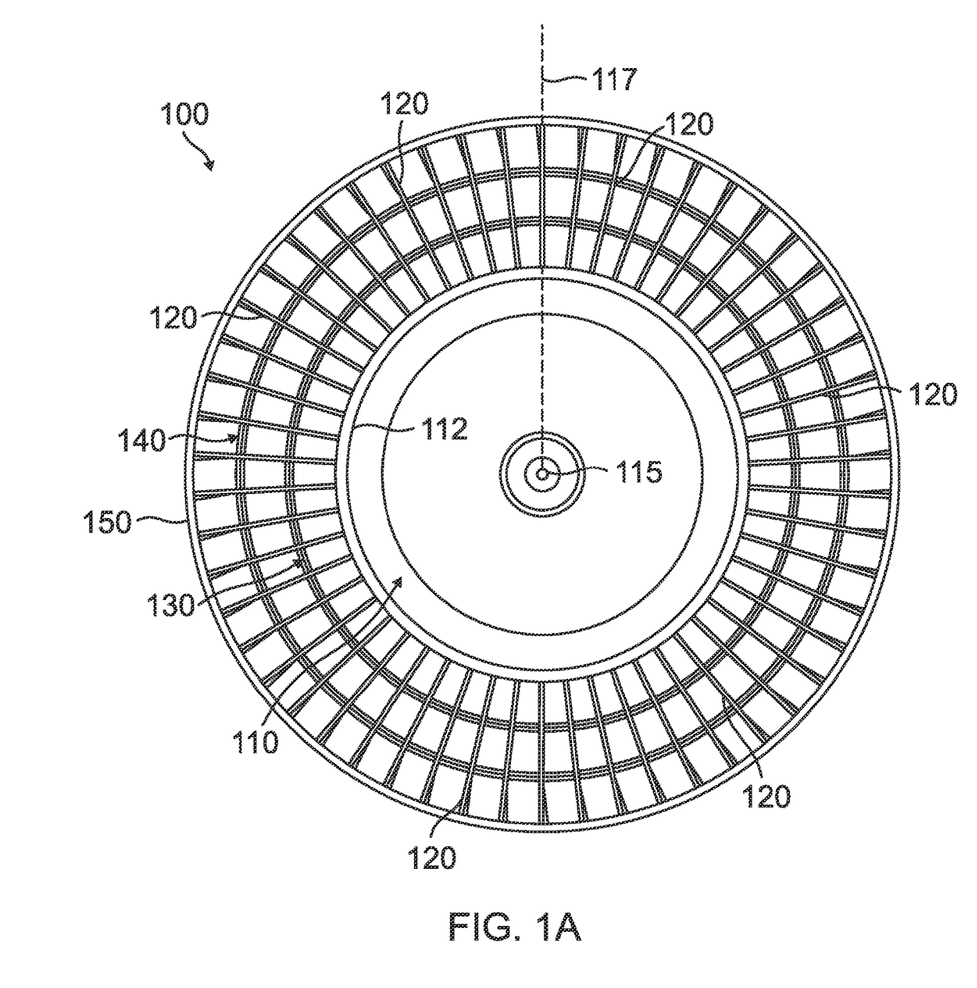
FIG. 1A is an end view of a ram air turbine rotor, from a forward perspective looking aft, according to one embodiment.
Figure 1B:
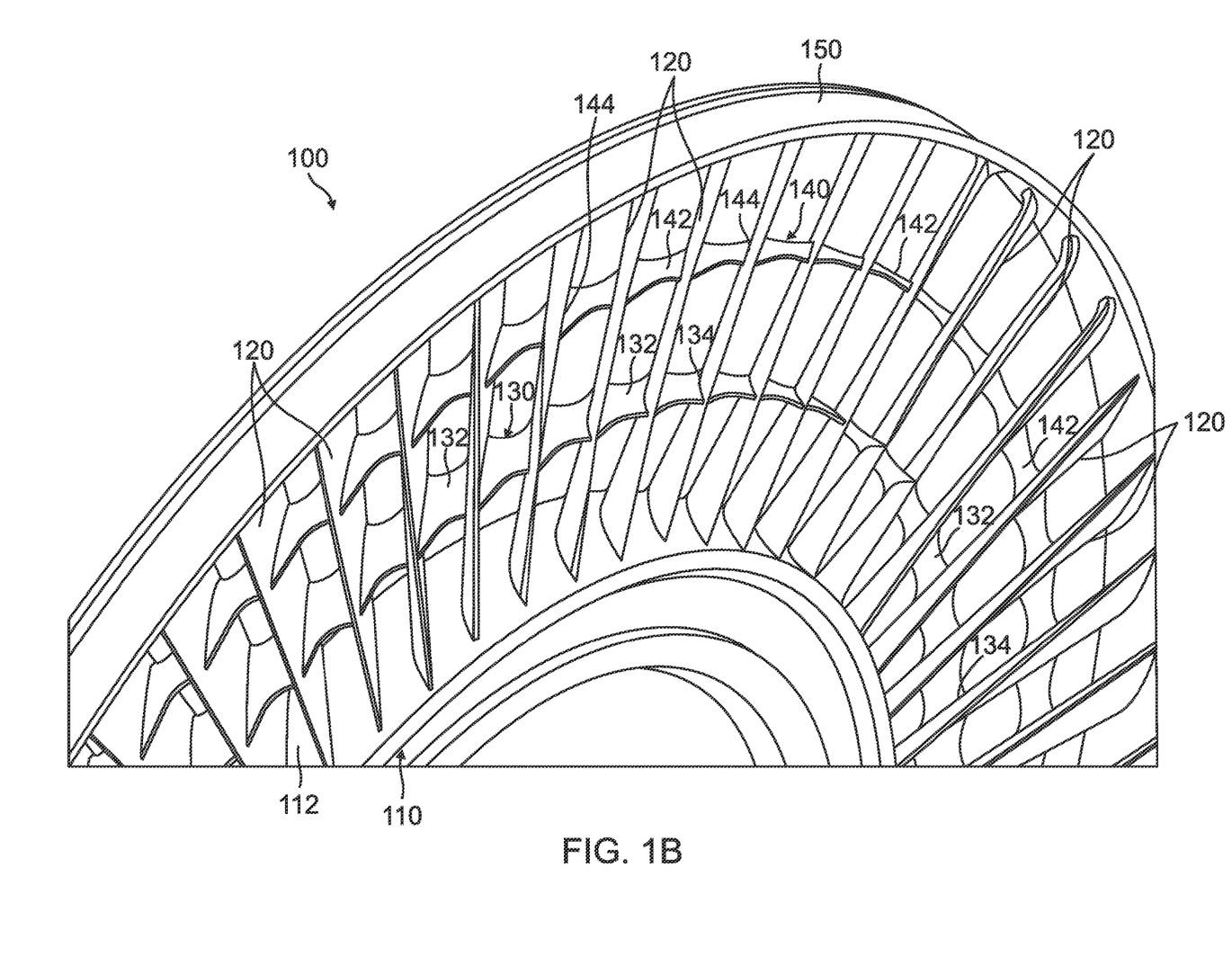
FIG. 1B is a perspective view of a section of the ram air turbine rotor of FIG. 1A.
Figure 1C:
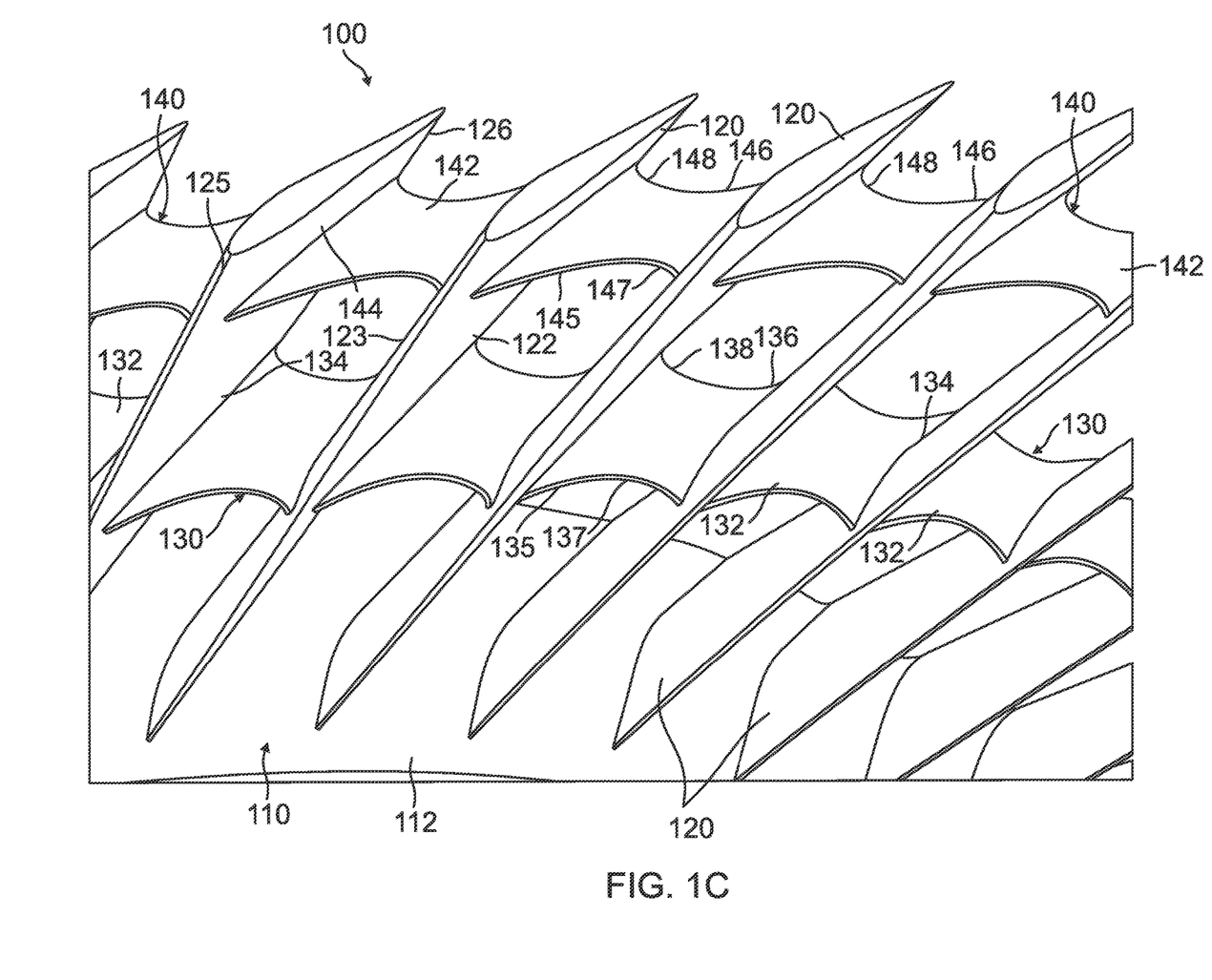
FIG. 1C is an enlarged perspective view of a section of the ram air turbine rotor of FIGS. 1A and 1B.

FIGS. 1A-1C illustrate a ram air turbine rotor 100, according to one embodiment. Generally, ram air turbine rotor 100 includes a support rotor disc 110, and a plurality of rotor blades 120 coupled to rotor disc 110. A first intra-flow path shroud structure 130 is coupled between rotor blades 120 at a first radial position. Optionally, as shown, a second intra-flow path shroud structure 140 is coupled between rotor blades 120 at a second radial position that is further away from rotor disc 110 than the first radial position. An outer rim 150 is circumferentially coupled to rotor blades 120 at distal ends thereof.

The rotor disc 110 can be annular-shaped and extends continuously about a centerline axis 115 (FIG. 1A). The rotor disc 110 is configured to be mounted on a shaft for rotation about centerline axis 115. The rotor blades 120 are mounted to a circumferential region 112 of rotor disc 110 and project outwardly along a radial axis 117. In one embodiment, rotor blades 120 are evenly spaced about circumferential region 112 of rotor disc 110. In other embodiments, rotor blades 120 can be unevenly spaced about circumferential region 112.

Each of rotor blades 120 includes a first face 122 and an opposing second face 123. The first face 122 and second face 123 cooperate to define a blade airfoil shape. In a chordwise direction, each first face 122 and second face 123 are joined at a leading edge 125 and a trailing edge 126 along a radial length of rotor blades 120. As used herein, the term "chordwise" refers to a direction along the blade between the leading edge and the trailing edge.

The rotor blades 120 can have a complex, three-dimensional curvature. For example, rotor blades 120 can have a predetermined amount of blade twist angle, sweep, and other curvature. It will be appreciated that rotor blades 120 may have alternate configurations or arrangements without departing from the scope of the present disclosure.

As shown in FIGS. 1B and 1C, shroud structure 130 includes a plurality of shroud sectors 132. Each shroud sector 132 is coupled between a respective pair of rotor blades 120 at shroud-to-blade interfaces 134. Each shroud sector 132 includes a first shroud edge 135 adjacent to leading edge 125 of the respective pair of rotor blades 120, and a second shroud edge 136 adjacent to trailing edge 126 of the respective pair of blades 120. The first shroud edge 135 includes a first curved segment 137, and second shroud edge 136 includes a second curved segment 138 (FIG. 1C).

Similarly, shroud structure 140 includes a plurality of shroud sectors 142. Each shroud sector 142 is coupled between a respective pair of rotor blades 120 at shroud-to-blade interfaces 144. Each shroud sector 142 includes a first shroud edge 145 adjacent to leading edge 125 of the respective pair of rotor blades 120, and a second shroud edge 146 adjacent to trailing edge 126 of the respective pair of blades 120. The first shroud edge 145 includes a first curved segment 147, and second shroud edge 146 includes a second curved segment 148 (FIG. 1C).

As described in further detail hereafter, the curved segments of the shroud edges are each partially defined by a semi-major axis and semi-minor axis of an ellipse. The semi-major axis is a predetermined portion of a spanwise distance along the shroud structure between a respective pair of the rotor blades. The semi-minor axis is a predetermined portion of an axial distance between the leading edge of one rotor blade and the trailing edge of an adjacent rotor blade of the respective pair of the rotor blades. In some embodiments, the curved segments are also each partially defined by a circle adjacent to the ellipse to form a blend region, with the circle having a predetermined diameter.

Figure 2:
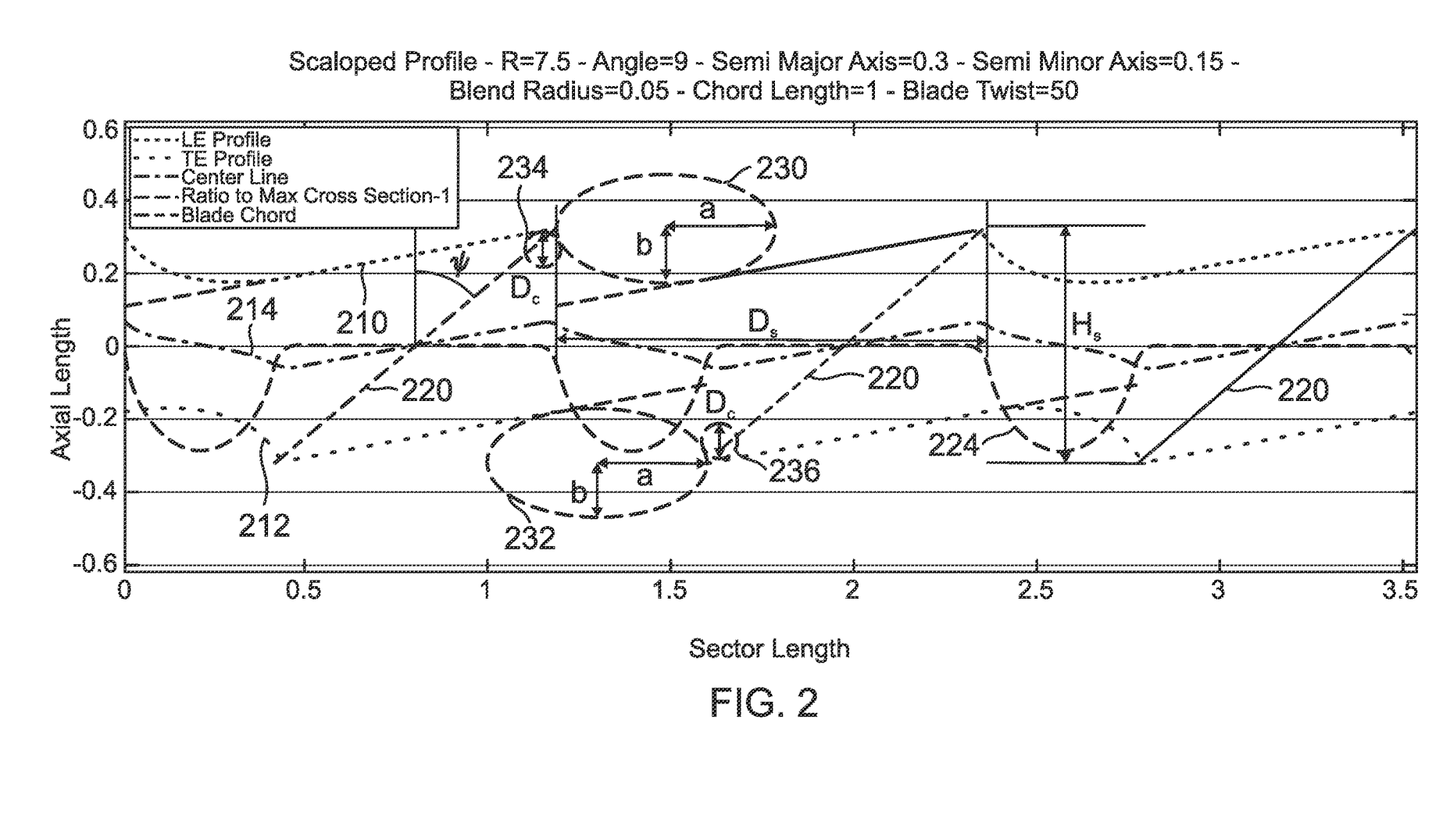
FIG. 2 is a graphical representation of parameters defining geometry for an intra-flow path shroud structure of a ram air turbine rotor, according to one example implementation.

For example, the semi-major axis can be about 10% to about 40% of a spanwise distance along the shroud structure between a respective pair of adjacent blades, the semi-minor axis can be about 10% to about 40% of an axial distance between the leading edge of one blade and the trailing edge of an adjacent blade. In some embodiments, the curved segments are also each partially defined by a circle adjacent to the ellipse to form the blend region, with the circle having a diameter that is 0% to about 25% of the axial distance between the leading edge of one blade and the trailing edge of an adjacent blade FIG. 2 is a graphical representation of parameters defining geometry for an intra-flow path shroud structure of a ram air turbine rotor, according to one example implementation. In this example, the shroud structure is represented from a radial point of view looking inboard, with respect to sector length vs. axial length. As shown in FIG. 2, curve 210 represents a leading edge (LE) profile of the shroud structure, curve 212 represents a trailing edge (TE) profile of the shroud structure, and curve 214 represents a center line of the shroud structure. The lines 220 represent the blade chord located between each sector of the shroud structure. The curve 224 represents a "for reference" line, which is used to ensure that there are no abrupt changes in axial thickness of the shroud structure (ratio to max cross section−1)

The axial distance includes a sector axial distance ($H_s$), representing the axial distance from the leading edge of one blade to the trailing edge of an adjacent blade, taking into account the twist angle between the blades, which changes the total axial distance from the leading edge to the trailing edge of the adjacent blade. The sector axial distance $H_s$ is defined by the following expression:

$$H_s = C * \cos(\psi)$$

where
$\psi$=Blade Twist Angle, and
C=Blade Chord Length.

The spanwise distance along the shroud structure includes a sector spanwise distance ($D_s$) along the shroud structure, which represents the angular gap between two coincident points, such as the distance from the leading edge of one blade to the leading edge of an adjacent blade, taking into account the wheel radius for a midspan profile and the number of blades. The sector spanwise distance $D_s$ along the shroud structure is defined by the following expression:

$$D_s = R * \frac{2\pi}{N}$$

where
R=Wheel Radius For Midspan Profile, and
N=Number of Blades.

As shown in FIG. 2, portions of curve 210 (LE profile) and curve 212 (TE profile) are defined by a semi-major axis (a) and semi-minor axis (b) of respective ellipses 230 and 232. Also, the leading edge of the blade chord adjacent to ellipse 230 is defined by a circle 234 with a diameter $D_c$ to form a blend region. Similarly, the trailing edge of the blade chord adjacent to ellipse 232 is defined by a circle 236 with a diameter $D_c$ to form a blend region. A tangent point between ellipse 230 and circle 234 leads to a straight line drawn to a tangent point between ellipse 232 and circle 236.

In various embodiments the ellipse and circle can be defined by the following range expressions:

$$0.1 D_s \leq a \leq 0.4 D_s$$

$$0.1 H_s \leq b \leq 0.4 H_s$$

$$0 \leq D_c \leq 0.25 H_s$$

where
 a=Ellipse Semi Major Axis,
 b=Ellipse Semi Minor Axis, and
 $D_c$=Circle Diameter.

In other words, the semi-major axis (a) of the ellipse can be about 10% to about 40% of the sector spanwise distance $D_s$ along the shroud structure, the semi-minor axis (b) of the ellipse can be about 10% to about 40% of the sector axial distance $H_s$, and the circle diameter (D r) can be 0% to about 25% of the sector axial distance $H_s$.

In the example shown in FIG. 2, the following values for $H_s$ and $D_s$ were used:
 $H_s$=0.6428
 $D_s$=1.1781.

Figure 3A:
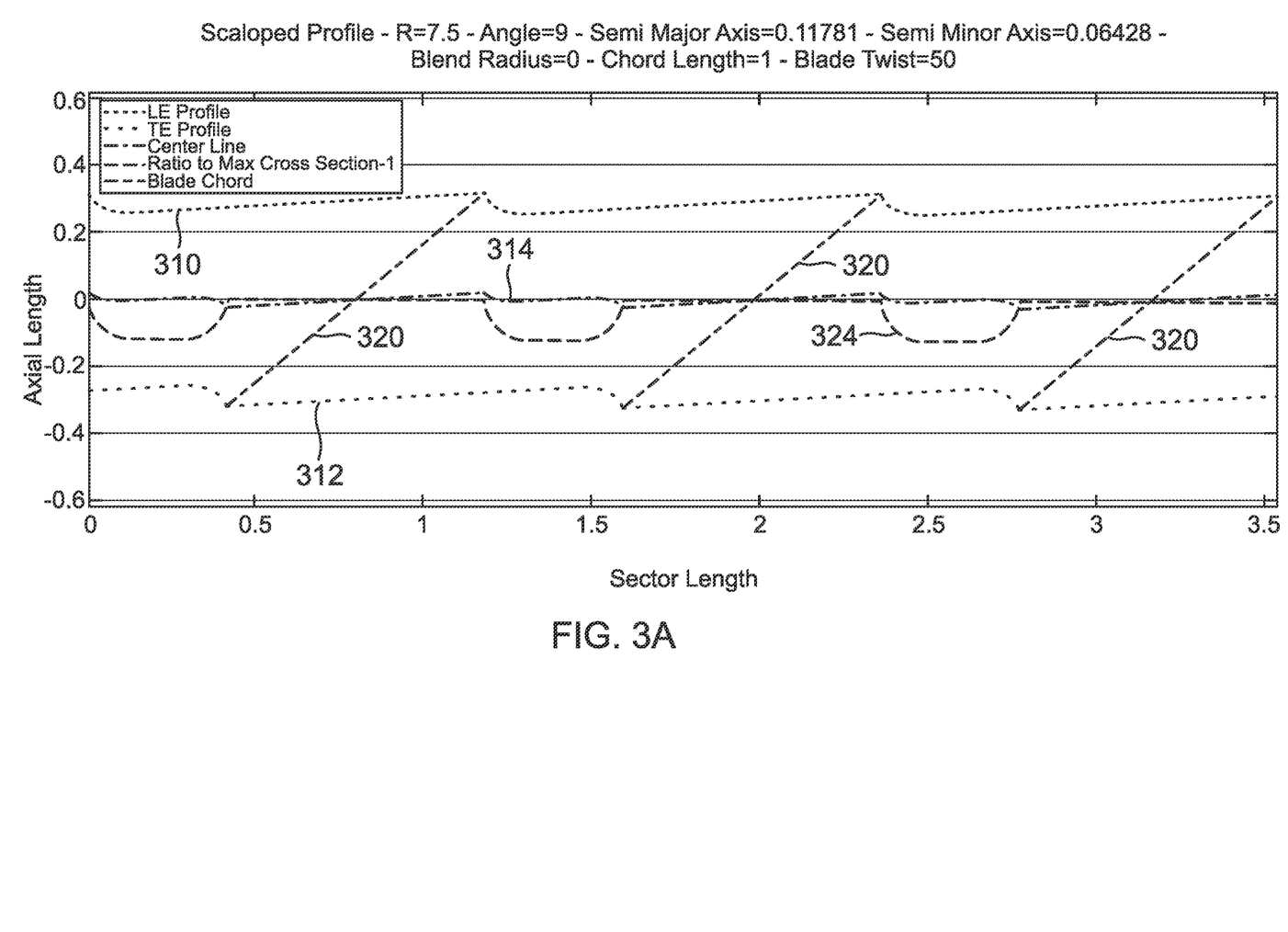
FIGS. 3A and 3B are graphical representations of parameters defining geometry for an intra-flow path shroud structure, according to another example implementation.
Figure 3B:
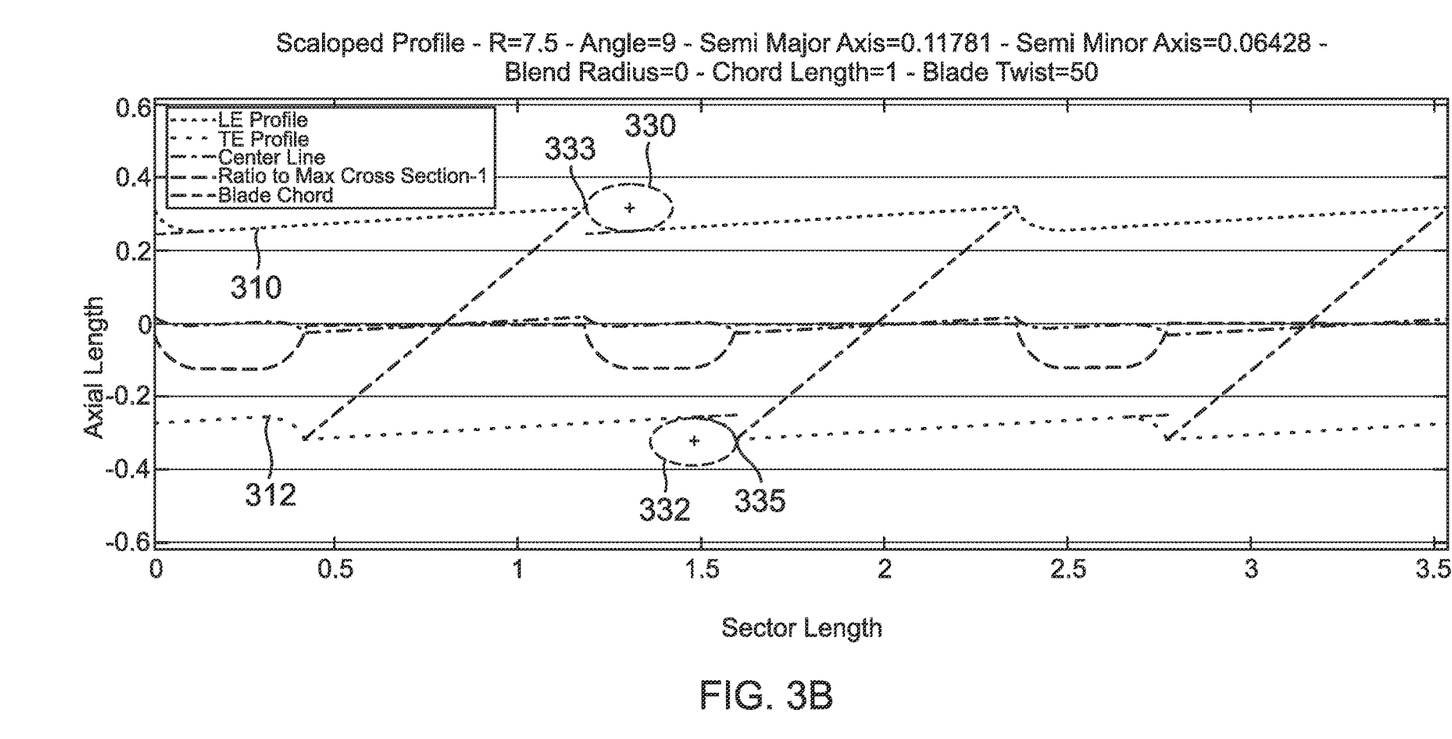

FIGS. 3A and 3B are graphical representations of parameters defining geometry for an intra-flow path shroud structure, according to another example implementation. In this example, the shroud structure is again represented from a radial point of view looking inboard, with respect to sector length vs. axial length. In addition, the following values for the sector axial distance $H_s$ and the sector spanwise distance $D_s$ along the shroud structure, were again used:
 $H_s$=0.6428
 $D_s$=1.1781.

In this example, the minimum values were used based on the above range expressions (FIG. 2) for the semi-major axis ($a_{min}$) and semi-minor axis ($b_{min}$) of an ellipse, and a circle diameter ($D_{c,min}$). Thus, the semi-major axis was computed as $0.1 D_s$, the semi-minor axis was computed as $0.1 H_s$, and the circle diameter was 0% of $H_s$, using the above values for $H_s$ and $D_s$, which resulted in the following values:
 $a_{min}$=0.11781
 $b_{min}$, =0.06428
 $D_{c,min}$=0.

The above values were used to generate the shroud geometry shown in FIGS. 3A and 3B, including a curve 310 representing the LE profile of the shroud structure, and a curve 312 representing the TE profile of the shroud structure. A curve 314 represents a center line of the shroud structure. The lines 320 represent the blade chord located between each sector of the shroud structure. The curve 324 represents a "for reference" line, which is used to ensure that there are no abrupt changes in axial thickness of the shroud structure (ratio to max cross section−1).

As shown in FIG. 3B, portions of curve 310 (LE profile) and curve 312 (TE profile) are defined by respective ellipses 330 and 332, to produce the scalloped profile of the shroud structure. Also, the leading edge of the blade chord adjacent to ellipse 330 has a sharp edge 333, as there is no blend region defined by a circle. Similarly, the trailing edge of the blade chord adjacent to ellipse 332 has a sharp edge 335, as again there is no blend region.

Figure 4A:
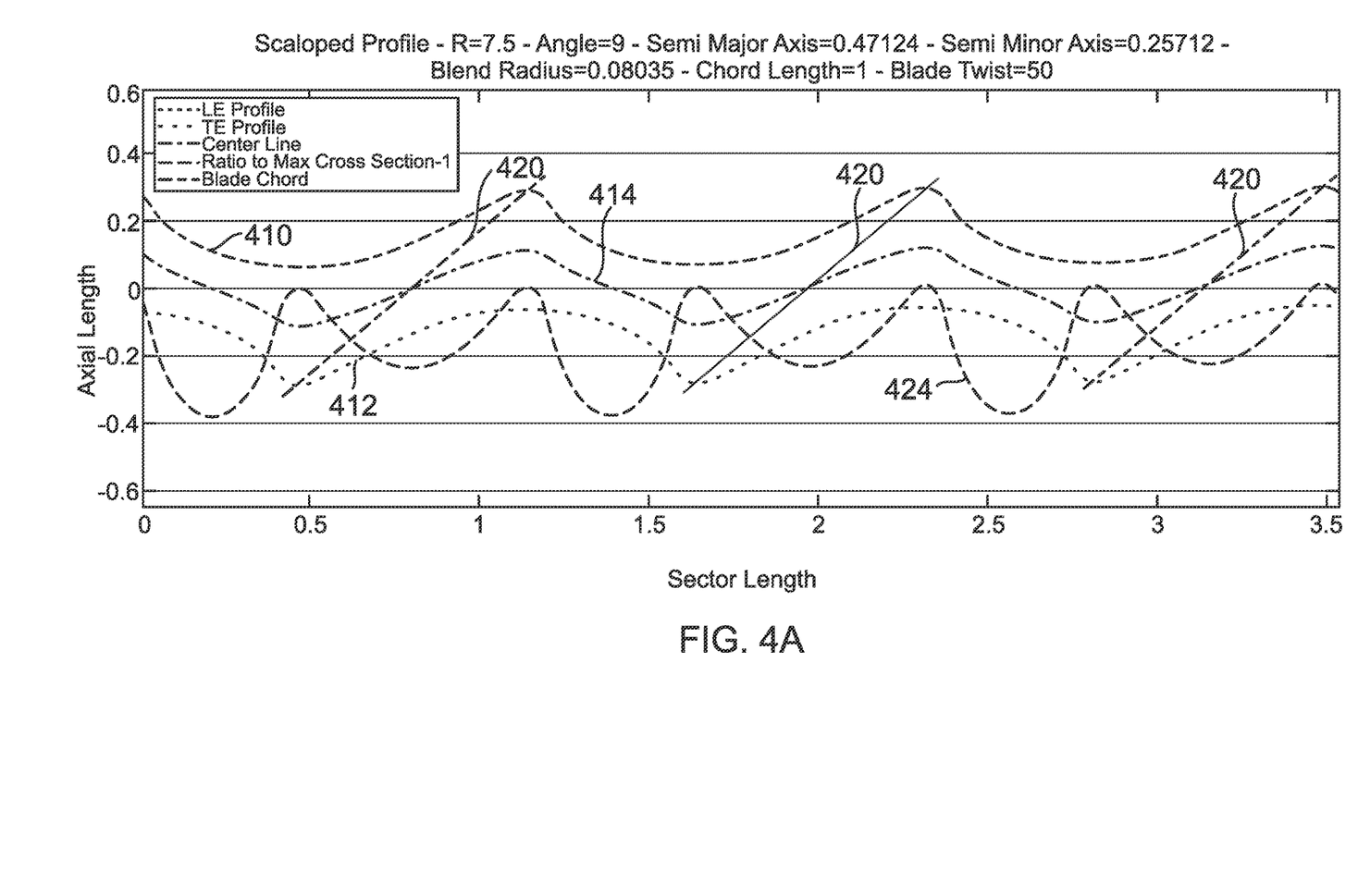
FIGS. 4A and 4B are graphical representations of parameters defining geometry for an intra-flow path shroud structure, according to a further example implementation.
Figure 4B:
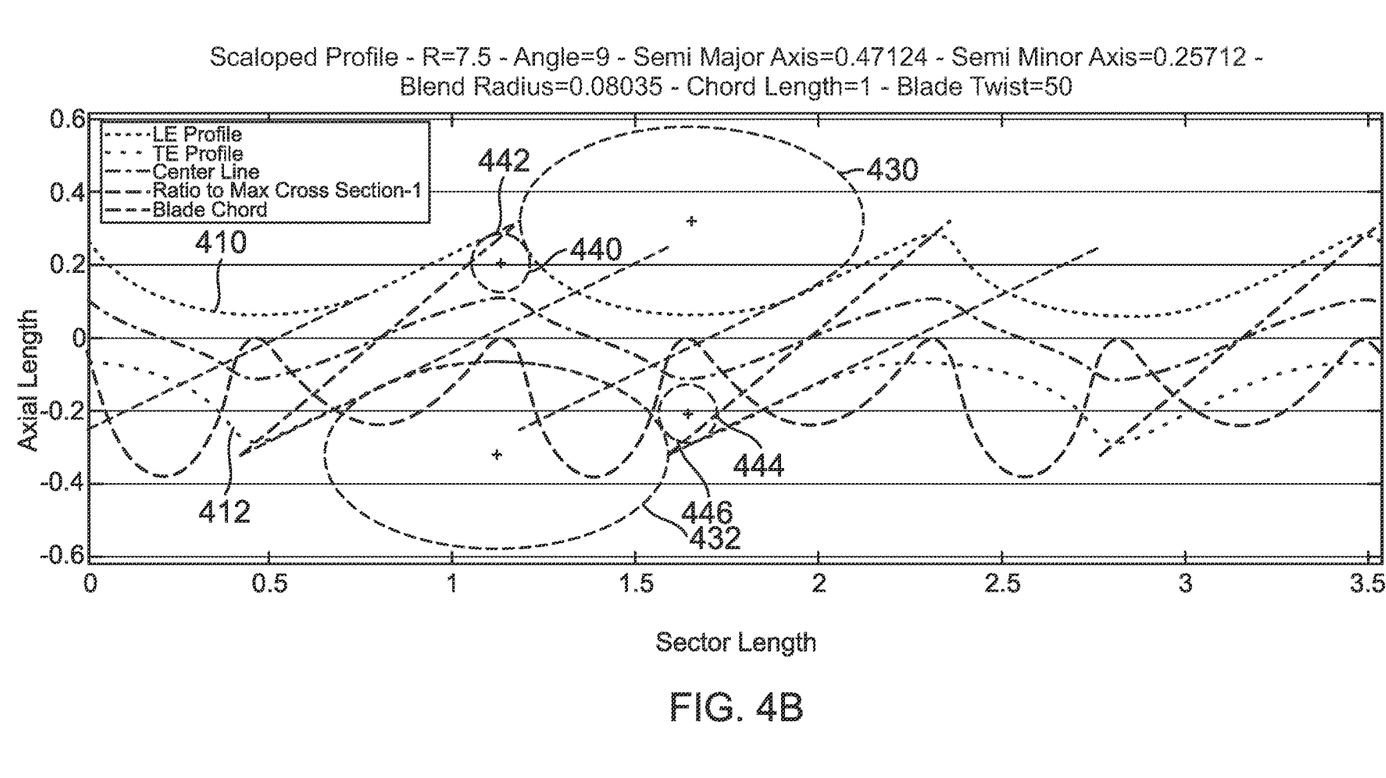

FIGS. 4A and 4B are graphical representations of parameters defining geometry for the intra-flow path shroud structure, according to a further example implementation. In this example, the shroud structure is again represented from a radial point of view looking inboard, with respect to sector length vs. axial length. In addition, the following values for the sector axial distance $H_s$ and the sector spanwise distance $D_s$ along the shroud structure were again used:
 $H_s$=0.6428
 $D_s$=1.1781.

In this example, the maximum values were used based on the above range expressions (FIG. 2) for the semi-major axis and semi-minor axis of an ellipse, and the circle diameter of a blend region. Thus, the semi-major axis ($a_{max}$) was computed as $0.4 D_s$, the semi-minor axis ($b_{max}$) was computed as 0.414, and the circle diameter ($D_{c,max}$) was computed as 0.2514, using the above values for $H_s$ and $D_s$, which resulted in the following values:
 $a_{max}$=0.47124
 $b_{max}$=0.25712
 $D_{c,max}$=0.1607

The above values were used to generate the shroud geometry shown in FIGS. 4A and 4B, including a curve 410 representing the LE profile of the shroud structure, and a curve 412 representing the TE profile of the shroud structure. A curve 414 represents a center line of the shroud structure. The lines 420 represent the blade chord located between each sector of the shroud structure. The curve 424 represents a "for reference" line, which is used to ensure that there are no abrupt changes in axial thickness of the shroud structure (ratio to max cross section−1).

As shown in FIG. 4B, portions of curve 410 (LE profile) and curve 412 (TE profile) are defined by respective ellipses 430 and 432, to produce the scalloped profile of the shroud structure. Also, the leading edge of the blade chord adjacent to ellipse 430 is defined by a circle 440 to form a blend region 442. Likewise, the trailing edge of the blade chord adjacent to ellipse 432 is defined by a circle 444 to form a blend region 446.

Figure 5A:
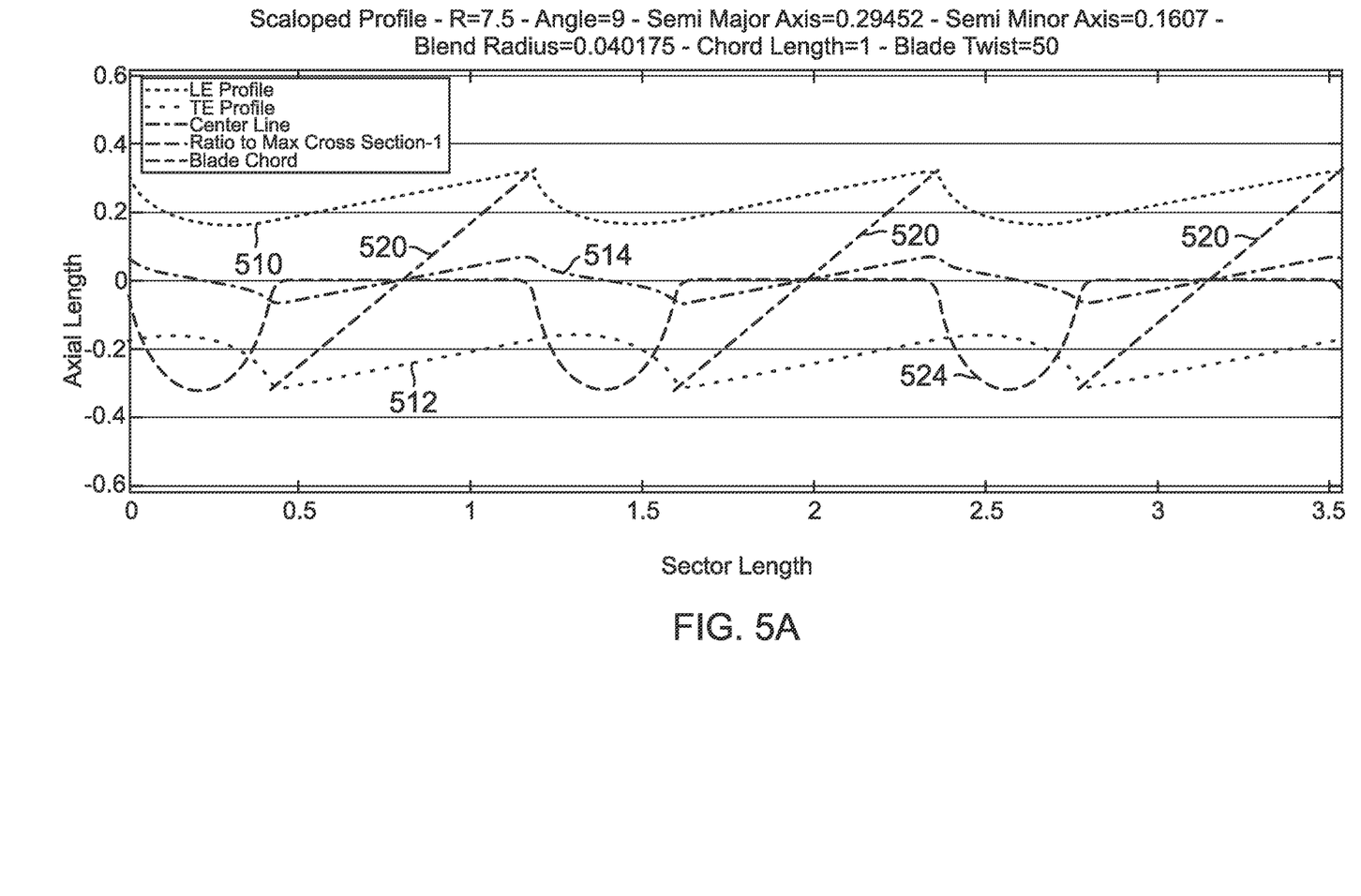
FIGS. 5A and 5B are graphical representations of parameters defining geometry for an intra-flow path shroud structure, according to another example implementation.
Figure 5B:
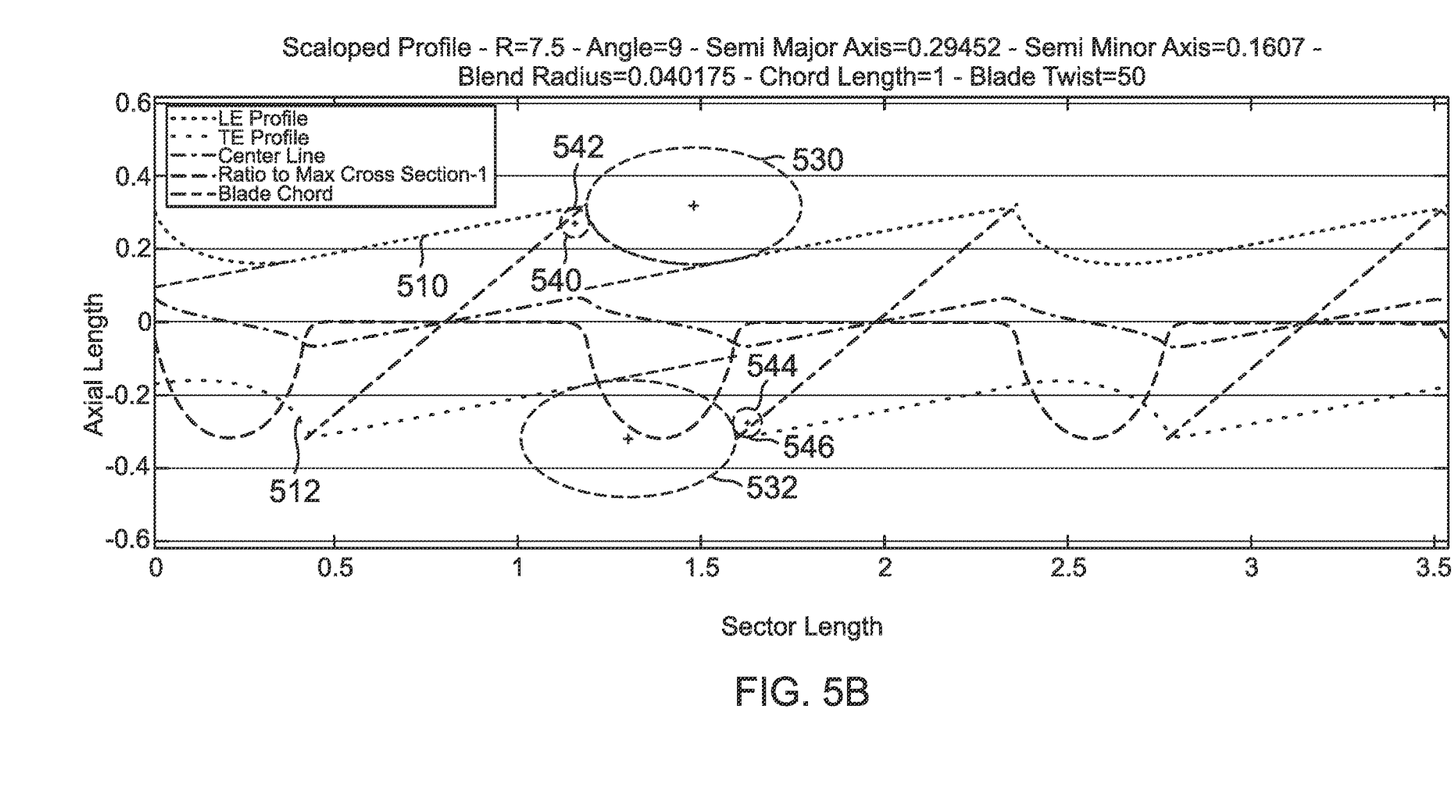

FIGS. 5A and 5B are graphical representations of parameters defining geometry for the intra-flow path shroud structure, according to another example implementation. In this example, the shroud structure is again represented from a radially point of view looking inboard, with respect to sector length vs. axial length. In addition, the following values for the sector axial distance $H_s$ and the sector spanwise distance $D_s$ along the shroud structure, were again used:
 $H_s$=0.6428
 $D_s$=1.1781.

In this example, nominal values were used based on the above range expressions (FIG. 2) for the semi-major axis and semi-minor axis of an ellipse, and the circle diameter of a blend region. Thus, the semi-major axis ($a_{nom}$) was computed as $0.25 D_s$, the semi-minor axis ($b_{nom}$) was computed as $0.25 H_s$, and the circle diameter ($D_{c,nom}$) was computed as $0.125 H_s$, using the above values for $H_s$ and $D_s$, which resulted in the following values:
 $a_{nom}$=0.294525
 $b_{nom}$=0.1607
 $D_{c,nom}$=0.08035

The above values were used to generate the shroud geometry shown in FIGS. 5A and 5B, including a curve 510 representing the LE profile of the shroud structure, and a curve 512 representing the TE profile of the shroud structure. A curve 514 represents a center line of the shroud structure. The lines 520 represent the blade chord located between each sector of the shroud structure. The curve 524 represents a "for reference" line, which is used to ensure that there are no abrupt changes in axial thickness of the shroud structure (ratio to max cross section–1).

As shown in FIG. 5B, portions of curve 510 (LE profile) and curve 512 (TE profile) are defined by respective ellipses 530 and 532, to produce the scalloped profile of the shroud structure. Also, the leading edge of the blade chord adjacent to ellipse 530 is defined by a circle 540 to form a blend region 542. Likewise, the trailing edge of the blade chord adjacent to ellipse 532 is defined by a circle 544 to form a blend region 546.

Figure 6A:
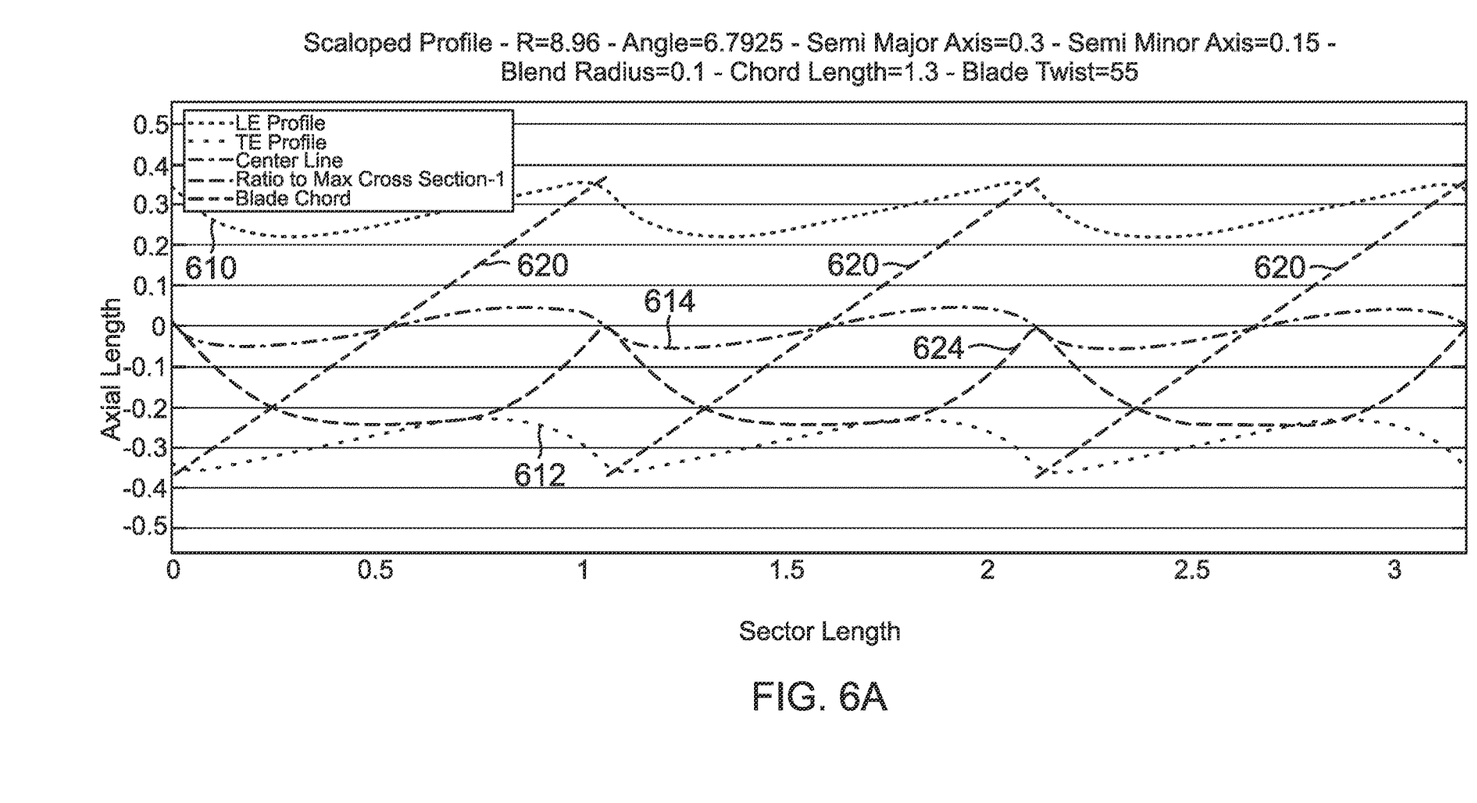
FIGS. 6A and 6B are graphical representations of parameters defining geometry for an intra-flow path shroud structure, according to an alternative implementation.
Figure 6B:
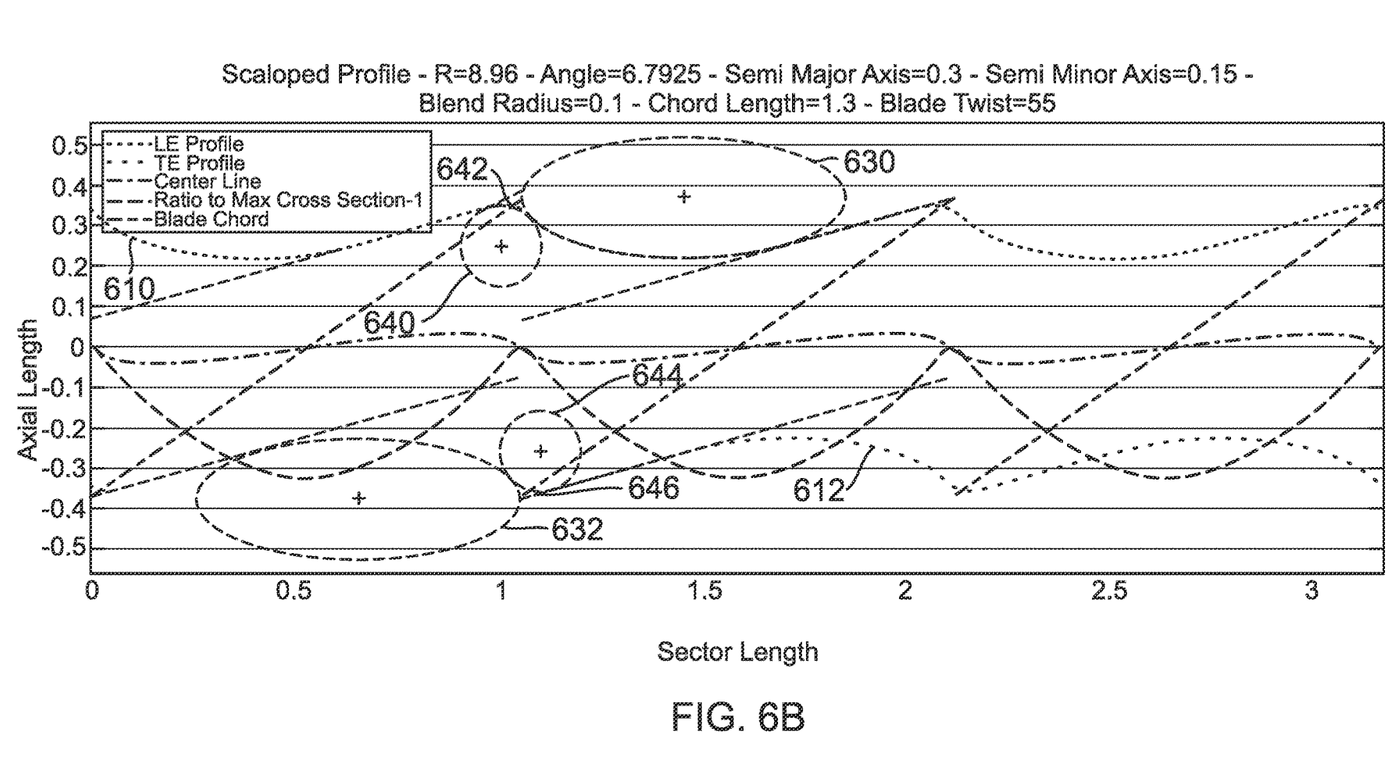

FIGS. 6A and 6B are graphical representations of parameters defining geometry for the intra-flow path shroud structure, according to an alternative implementation. In this example, the shroud structure is again represented from a radial point of view looking inboard, with respect to sector length vs. axial length. In addition, the following values for the sector axial distance $H_s$ and the sector spanwise distance $D_s$ along the shroud structure, were used:

$H_s$=0.7456
$D_s$=1.0622

In this example, values were used based on the above range expressions (FIG. 2) for the semi-major axis and semi-minor axis of an ellipse, and the circle diameter of a blend region. Thus, the semi-major axis (a) was computed as $0.282D_s$, the semi-minor axis (b) was computed as $0.2012H_s$, and the circle diameter $D_c$ was computed as $0.2682H_s$, using the above values for $H_s$ and $D_s$, which resulted in the following values:

a=0.3
b=0.15
$D_c$=0.2

The above values were used to generate the shroud geometry shown in FIGS. 6A and 6B, including a curve 610 representing the LE profile of the shroud structure, and a curve 612 representing the TE profile of the shroud structure. A curve 614 represents a center line of the shroud structure. The lines 620 represent the blade chord located between each sector of the shroud structure. The curve 624 represents a "for reference" line, which is used to ensure that there are no abrupt changes in axial thickness of the shroud structure (ratio to max cross section–1).

As shown in FIG. 6B, portions of curve 610 (LE profile) and curve 612 (TE profile) are defined by respective ellipses 630 and 632, to produce the scalloped profile of the shroud structure. Also, the leading edge of the blade chord adjacent to ellipse 630 is defined by a circle 640 to form a blend region 642. Likewise, the trailing edge of the blade chord adjacent to ellipse 632 is defined by a circle 644 to form a blend region 646.

Figure 7:
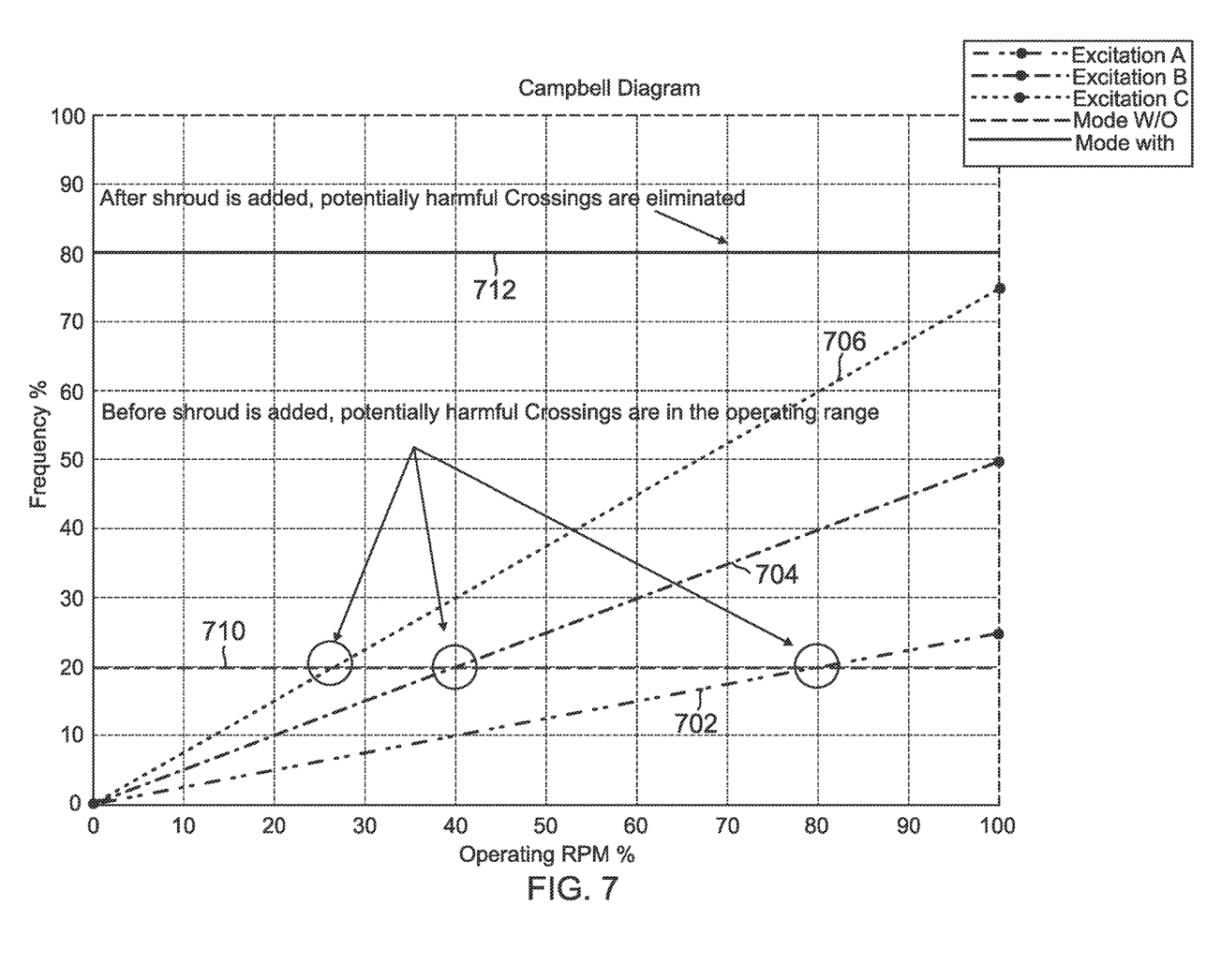
FIG. 7 is a Campbell diagram showing the modal benefits of using an intra-flow path shroud in a ram air turbine rotor.

FIG. 7 is a Campbell diagram showing the modal benefits of using the intra-flow path shroud in a ram air turbine rotor. The diagram plots the operating revolutions per minute (RPM) percentage of a ram air turbine rotor full speed, with respect to the resonance frequency percentage. The diagonal lines 702, 704, and 706 respectively represent excitation sources A, B, and C. The horizontal lines 710 and 712 are typical resonance modes, respectively without the intra-flow path shroud added (710), and with the shroud added (712).

As shown in FIG. 7, before the present shroud band is added, potentially harmful crossings of the excitation sources can occur in the operating range of the ram air turbine rotor. After the intra-flow path shroud is added, potentially harmful crossings of the excitation sources are eliminated. The increased stiffness provided by the intra-flow path shroud drives the resonance frequency higher, so that the excitation sources do not cross the resonance mode (712) during the operating range. It should be noted that the resonance frequency percent change from 20 to 80 for the resonance modes shown in FIG. 7 is only exemplary, as such a change provided by the intra-flow path shroud can be greater or less that this amount.

Example Embodiments

Example 1 includes a method of tuning modal responses in a ram air turbine rotor, the method comprising: forming at least a first intra-flow path shroud structure between a plurality of rotor blades at least at a first radial position in the ram air turbine rotor, the first intra-flow path shroud structure formed to include a plurality of first shroud sectors coupled between a respective pair of rotor blades at first shroud-to-blade interfaces; and forming the first shroud sectors with first scallop-shaped sections in acute corners of the first shroud-to-blade interfaces, the first scallop-shaped sections configured to minimize a circumferential stress concentration at the first shroud-to-blade interfaces; wherein the first intra-flow path shroud structure substantially eliminates harmful crossings of one or more excitation sources with a resonance mode, by increasing a resonance frequency of the ram air turbine rotor during operation.

Example 2 includes the method of Example 1, wherein the first scallop-shaped sections are each partially defined by a respective ellipse having a semi-major axis and a semi-minor axis; wherein the semi-major axis is a predetermined portion of a spanwise distance along the shroud structure between the respective pair of the rotor blades; wherein the semi-minor axis is a predetermined portion of an axial distance between the leading edge of one rotor blade and the trailing edge of an adjacent rotor blade of the respective pair of the rotor blades.

Example 3 includes the method of Example 2, wherein: the predetermined portion of the spanwise distance along the shroud structure of the semi-major axis of each ellipse is about 10% to about 40% of the spanwise distance along the shroud structure between the respective pair of the rotor blades; and the predetermined portion of the axial distance of the semi-minor axis of each ellipse is about 10% to about 40% of the axial distance between the leading edge of one rotor blade and the trailing edge of the adjacent rotor blade of the respective pair of the rotor blades.

Example 4 includes the method of any of Examples 1-3, wherein the first scallop-shaped sections are each further defined by a respective circle having a predetermined diameter, each circle adjacent to each ellipse.

Example 5 includes the method of Example 4, wherein the predetermined diameter of each circle is between 0% to about 25% of the axial distance.

Example 6 includes the method of any of Examples 1-5, further comprising: forming one or more additional intra-flow path shroud structures circumferentially between a plurality of rotor blades at one or more additional radial positions in the ram air turbine rotor, the one or more additional intra-flow path shroud structures formed to include a plurality of additional shroud sectors coupled between a respective pair of rotor blades at additional shroud-to-blade interfaces; and forming the additional shroud sectors with additional scallop-shaped sections in acute corners of the additional shroud-to-blade interfaces, the additional scallop-shaped sections configured to minimize a circumferential stress concentration at the additional shroud-to-blade interfaces.

Example 7 includes the method of Example 6, wherein the one or more additional intra-flow path shroud structures eliminate harmful crossings of one or more excitation sources with the resonance mode, by increasing the resonance frequency of the ram air turbine rotor during operation.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method of tuning modal responses in a ram air turbine rotor, the method comprising:

forming at least a first intra-flow path shroud structure between a plurality of rotor blades at least at a first radial position in the ram air turbine rotor, the first intra-flow path shroud structure formed to include a plurality of first shroud sectors coupled between a respective pair of rotor blades at first shroud-to-blade interfaces; and forming the first shroud sectors with first scallop-shaped sections in acute corners of the first shroud-to-blade interfaces, the first scallop-shaped sections configured to minimize a circumferential stress concentration at the first shroud-to-blade interfaces;

wherein the first scallop-shaped sections are each partially defined by a respective ellipse having a semi-major axis and a semi-minor axis;

wherein the semi-major axis is a predetermined portion of a spanwise distance along the shroud structure between the respective pair of the rotor blades;

wherein the semi-minor axis is a predetermined portion of an axial distance between a leading edge of one rotor blade and a trailing edge of an adjacent rotor blade of the respective pair of the rotor blades;

wherein the first intra-flow path shroud structure substantially eliminates harmful crossings of one or more excitation sources with a resonance mode, by increasing a resonance frequency of the ram air turbine rotor during operation.

2. The method of claim 1, wherein:

the predetermined portion of the spanwise distance along the shroud structure of the semi-major axis of each ellipse is about 10% to about 40% of the spanwise distance along the shroud structure between the respective pair of the rotor blades; and the predetermined portion of the axial distance of the semi-minor axis of each ellipse is about 10% to about 40% of the axial distance between the leading edge of one rotor blade and the trailing edge of the adjacent rotor blade of the respective pair of the rotor blades.

3. The method of claim 1, wherein the first scallop-shaped sections are each further defined by a respective circle having a predetermined diameter, each circle adjacent to each ellipse.

4. The method of claim 3, wherein the predetermined diameter of each circle is between 0% to about 25% of the axial distance.

5. The method of claim 1, further comprising:

forming one or more additional intra-flow path shroud structures circumferentially between a plurality of rotor blades at one or more additional radial positions in the ram air turbine rotor, the one or more additional intra-flow path shroud structures formed to include a plurality of additional shroud sectors coupled between a respective pair of rotor blades at additional shroud-to-blade interfaces; and forming the additional shroud sectors with additional scallop-shaped sections in acute corners of the additional shroud-to-blade interfaces, the additional scallop-shaped sections configured to minimize a circumferential stress concentration at the additional shroud-to-blade interfaces.

6. The method of claim 5, wherein the one or more additional intra-flow path shroud structures eliminate harmful crossings of one or more excitation sources with the resonance mode, by increasing the resonance frequency of the ram air turbine rotor during operation.

* * * * *